United States Patent [19]
Fembök

[11] Patent Number: 6,075,238
[45] Date of Patent: Jun. 13, 2000

[54] OPTICAL SURVEILLANCE DEVICE

[75] Inventor: Josef Fembök, Mühldorf, Germany

[73] Assignee: Ines-Elektronik-Systementwicklungs-Produktions GmbH, Muhldorf, Germany

[21] Appl. No.: 09/091,910

[22] PCT Filed: Oct. 23, 1997

[86] PCT No.: PCT/EP97/05869

§ 371 Date: Jun. 24, 1998

§ 102(e) Date: Jun. 24, 1998

[87] PCT Pub. No.: WO98/18026

PCT Pub. Date: Apr. 30, 1998

[30] Foreign Application Priority Data

Oct. 24, 1996 [EP] European Pat. Off. ............ 196 44 278

[51] Int. Cl.[7] .................................................. G01D 21/04
[52] U.S. Cl. .......................................... 250/221; 340/556
[58] Field of Search ................................ 250/221, 222.1; 340/555–557

[56] References Cited

U.S. PATENT DOCUMENTS

| | | | |
|---|---|---|---|
| 4,107,522 | 8/1978 | Walter | 250/221 |
| 4,127,771 | 11/1978 | Sick | 250/221 |
| 4,339,660 | 7/1982 | Buchholz et al. | 250/221 |
| 4,546,246 | 10/1985 | Bechtel | 340/556 |
| 5,004,908 | 4/1991 | Nakamura | 340/556 |
| 5,008,530 | 4/1991 | Ball | 250/221 |
| 5,180,910 | 1/1993 | Sprattle et al. | 340/556 |

*Primary Examiner*—Stephone B. Allen
*Attorney, Agent, or Firm*—Nawrocki, Rooney & Sivertson, P.A.

[57] ABSTRACT

An optical monitoring means comprises a plurality of pattern fields, which are arranged at one end of the area to be monitored, objectives at the other end of the area to be monitored and which are respectively associated with the pattern fields, reflectors, which deflect the image rays from the objectives onto a image projection surface, a sensor means, onto which the objectives throw an image of the pattern field, and which scans the image and feeds corresponding signals to a signal processing means, which ascertains whether the image received by the sensor means possesses the same optical characteristics as the pattern fields. As an alternative the monitoring means comprises a series of pattern fields is arranged at opposite sides of an area to be monitored, two units, which respectively comprise an objective and a reflector, are arranged at diagonally opposite corners of the area to be monitored, the units are so rotatably arranged that one objective in each case scans the pattern field arranged opposite to it, and that opposite each reflector a sensor means is placed, onto which the objectives throw the image of the pattern field, and which scans the image and feeds corresponding signals to a signal processing means, which ascertains whether the image received by the sensor means possesses the same optical characteristics as the pattern fields.

32 Claims, 2 Drawing Sheets

OPTICAL SURVEILLANCE DEVICE

BACKGROUND OF THE INVENTION

The invention relates to an optical monitoring means.

For monitoring danger areas around machines, security areas, elevator doors or the safety monitoring of apartments photoelectric detectors and beam arrays using same have so far been employed. Such beam arrays suffer from the disadvantage that a plurality of active elements, i. e. light sources and sensors, must be arranged on either side of the monitored area, something which increases the costs of such a beam array. Furthermore all active elements must be connected together by wiring in order to permit synchronization and signal processing. The electronic circuitry necessary for this is also a substantial cost factor.

The German patent publication 38 42 142 C1 discloses a method for the optical recognition of objects, the means comprising a sensor means, on which an objective projects the image of a pattern field, and a signal processing means in order to ascertain whether the image received by the sensor means possesses the same optical characteristics as the pattern field. At one end of the monitored area there is therefore a passive element, namely the pattern field, whereas the sensor means together with the associated objective is placed at the other end of the monitored area so that no power supply and control lines must be laid from the one end of the monitored area to the other end. Furthermore the number of active elements is reduced.

SUMMARY OF THE INVENTION

In contradistinction to this the invention has the aim of creating a monitoring means, which may be implemented at a moderate price, the number of active elements being reduced with the possibility of ensuring a compact structure.

In order to attain this object the optical monitoring means of the invention is characterized by a plurality of pattern fields, which are respectively arranged at one end of the area to be monitored, objectives at the other end of the area to be monitored and which are respectively associated with the pattern fields, reflectors, which deflect the image rays from the objectives onto a image projection surface, a sensor means, onto which the objectives throw an image of the pattern field, and which scans the image and feeds corresponding signals to a signal processing means, which ascertains whether the image received by the sensor means possesses the same optical characteristics as the pattern fields.

The monitoring means is made up of detectors of the above mention type and comprises a plurality of superposed detectors. Owing to this arrangement a monitoring means is created, whose function is comparable with that of a beam array, several optical detectors being utilized in order to form the array of the monitoring means. Nevertheless a single sensor means suffices, which is best a CCD camera, in order to respond to the image on the image projection surface and to supply corresponding signals to the signal processing means.

Moreover the invention relates to a monitoring means comprising optical detectors of the type initially mentioned, which is characterized in that a series of pattern fields is arranged at opposite sides of an area to be monitored, that two units, which respectively comprise an objective and a reflector, are arranged at diagonally opposite corners of the area to be monitored, that the units are so rotatably arranged that one objective in each case scans the pattern field arranged opposite to it, and that opposite each reflector a sensor means is placed, onto which the objectives throw the image of the pattern field, and which scans the image and feeds corresponding signals to a signal processing means, which ascertains whether the image received by the sensor means possesses the same optical characteristics as the pattern fields. In this respect, although two sensor means are required, a whole series of optical components is rendered unnecessary.

According to an advantageous development of the invention the sensor means is a CCD camera as is presently commercially available at a moderate price. Such a camera can be operated in a simple manner as well so that it supplies the necessary signals for the signal processing means.

A further advantageous feature of the invention is that the optical characteristics of the pattern field are such that the pattern field is divided up into light and dark area parts in a predetermined manner. In the case of such a pattern field it is possible to employ both the lightness or, respectively, color of the area parts and also the contrast between the light and dark area parts for processing.

It is an advantage for the light area parts to have an orange color (marker color) and more particularly have a fluorescent coloring material, because this renders it more readily possible to identify the light areas.

A further advantageous development of the invention is such that the light areas and the dark areas have complementary colors, as for instance yellow and green, this meaning that a particularly simple way of processing is created.

In the simplest case the pattern field is so structured that four area parts are provided, diagonally oppositely placed area parts being light and the two other area parts being dark.

In the monitoring system it is an advantage for the pattern fields to be provided in the form of strips, which may be applied simply at the required positions.

As an objective it is advantageously possible to utilize a convex lens and a collimator in order to produce a sufficiently sharp image of the pattern field on the sensor means.

In order to improve the image of the pattern field on the sensor means the objective or at least the convex lens is arranged in a sliding fashion for motion along the optic axis so that exact focussing is possible.

In order to prevent external effects to the maximum extent the detector is characterized in that at the objective a diaphragm is provided which blanks out the image, which is thrown on the sensor means, with the exception of the image of the area parts.

It is furthermore an advantage if each reflector is set at 45° to the optic axis of the associated objective so that on the image projection surface only an image of the pattern fields, and no other image, is produced.

The reflectors are in this respect preferably arranged with an offset, equal to a step corresponding to the pattern field of one detector, in a downward direction and toward the objective. This means that the images of the individual pattern fields fit together in the image projection area without any gaps.

In accordance with an advantageous development of the invention the means is characterized in that the reflector is a semi-transparent mirror and that on a basic area, which as regards the semi-transparent mirror arrangement is opposite to the image projection area, a reference image related to the image is provided on the image projection area in order to check correct functioning of the arrangement. The sensor means (a CCD camera), which scans the image on the image projection surface, "looks at" the reference area through the semi-transparent mirror so that when the sensor means detects a change in the optical characteristics of the image without the ray path of a detector being interrupted, it is possible to conclude that there is a fault in the function of the arrangement.

The reflectors may be provided in a particularly simple fashion if they are produced by machining one side face of an acrylic polymer body, whose top face, which is perpendicular to the side face, constitutes the image projection surface.

In the case of the last mentioned embodiment of the invention it is an advantage if the units are only able to be turned to and fro to such an extent that the pattern fields only are scanned. Accordingly there is no gap in time between one monitoring detector and the next one.

On the other hand it may be advantageous if the units are able to be turned through complete revolutions, and in this case, when the objective is turned away from a pattern field, a reference image is scanned for checking correct operation of the arrangement. As a result although there is no gap between one monitoring detector and the next one, on the other hand the function of the arrangement is continuously checked.

DESCRIPTION OF THE SPECIFIC EMBODIMENTS

Figure 1:
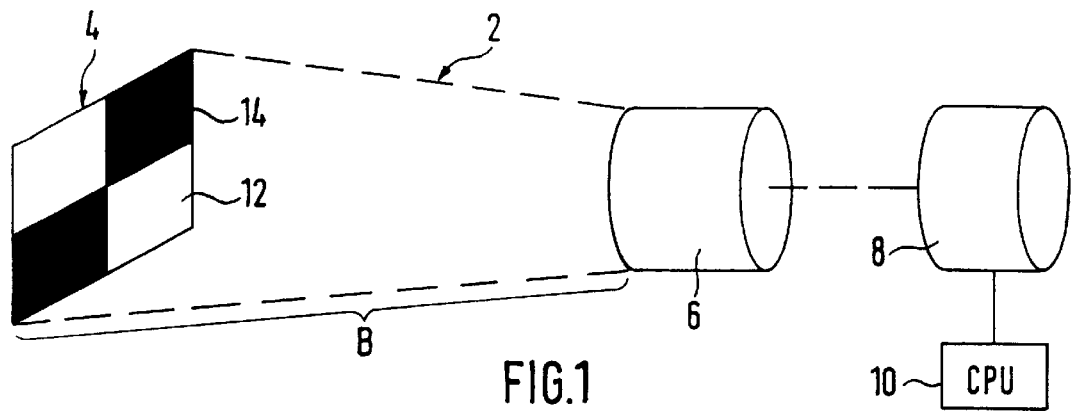
FIG. 1 is a diagrammatic representation of an optical detector.

FIG. 1 shows an optical detector 2, which possesses a pattern field 4 at the end of a monitored area B. An objective 6 at the other end of the monitored area throws an image of the pattern field 4 on a sensor means 8, which is more particularly a CCD camera. A signal processing means 10 is connected with the CCD camera 8 in order to ascertain whether the image received by the CCD camera 8 possesses the same optical characteristics as the pattern field 4. For this purpose a reference pattern field with the same characteristics as those of the actual pattern field can be stored in the monitoring means 10.

The optical characteristics of the pattern field 4 are such that the pattern field 4 is divided in a predetermined fashion into light and dark area parts 12 and 14, four area parts being provided, of which two diagonally opposite area parts are light and the two others are dark. The light area parts may have an orange color or possess a fluorescent coloring material, whereas the dark area parts may be black. The light area parts 12 and the dark area parts 14 may also have complementary colors, as for instance yellow and green.

The objective 6 may comprise a convex lens and a collimator in order to ensure an exact imaging of the pattern field 4 on the sensor means 8. Furthermore the objective 6 or at least the convex lens may be arranged for sliding motion along the optic axis. For the objective 6 a diaphragm (not illustrated) may be provided which blanks out the image projected by the objective 6 on the sensor means 8 with the exception of the image of the area parts to avoid interfering effects.

The detector functions as follows. When an object intrudes into the monitored area, such object will as a rule possess a different degree of brightness or color to the light area part and/or dark area part of the pattern field. The camera detects the difference in lightness or in color and the signal processing means will for example turn off the machien being monitored. A pattern field with light and dark area parts will ensure that even if the object intruding into the monitored area possesses the same color or brightness (lightness) as for example the light area part, the intrusion of such object will nevertheless be detected, because the object will then also cover the dark area part so that the detected optical characteristics will differ from those of the pattern field. It is in this manner that a reaction of the detector will be ensured on every intrusion by an object.

Using such a detector monitoring means may be produced, with which larger areas may be monitored, two or more such optical detectors being employed and the processing of signals from a plurality of detectors being performed in one or in two signal processing means.

Figure 2:
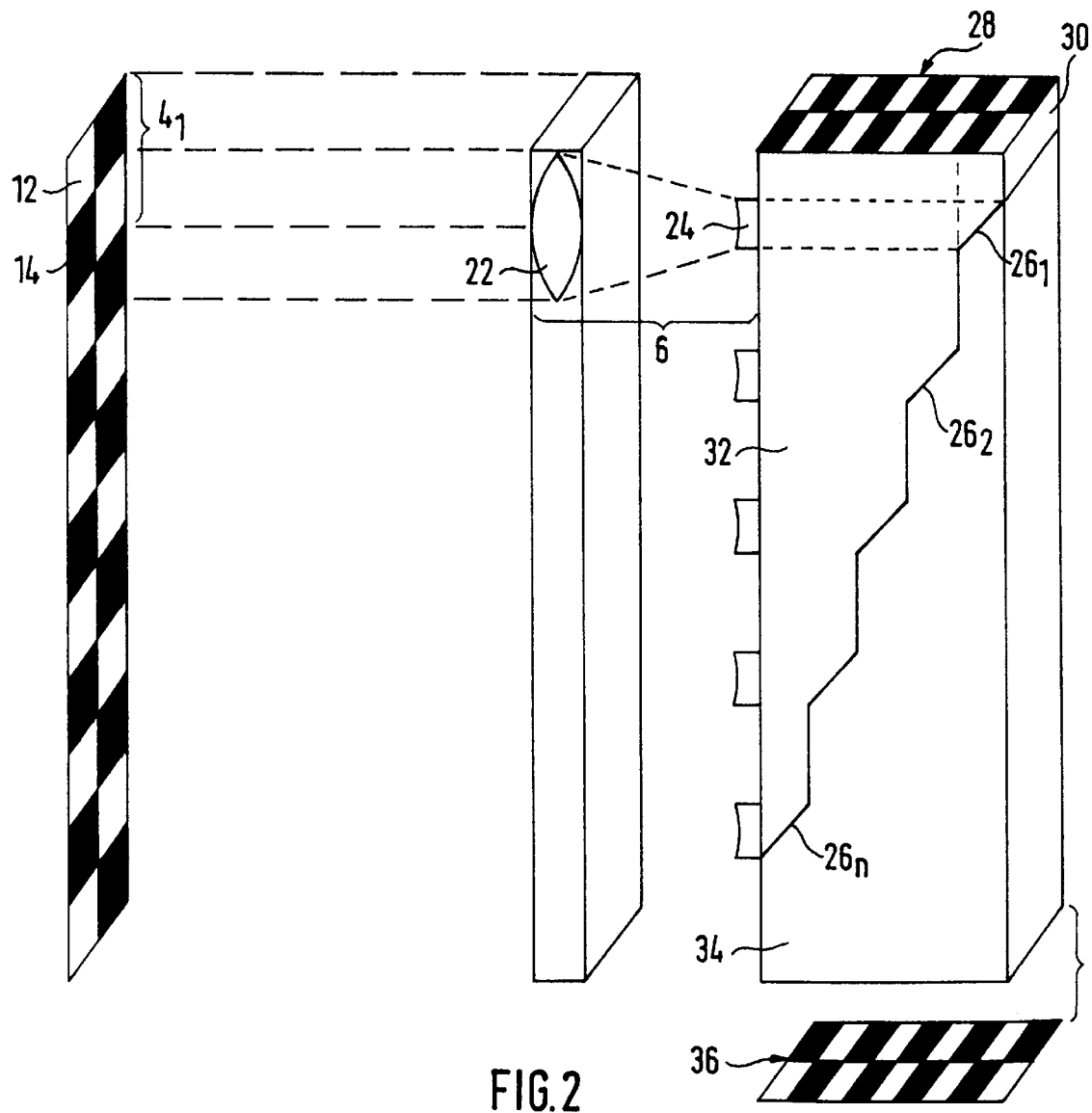
FIG. 2 is a diagrammatic representation of a monitoring means, which in principle comprises optical detectors as in FIG. 1.

FIG. 2 diagrammatically shows a monitoring means 20, which in principle is composed of optical detectors of the type described above, the detectors being superposed. For example the pattern field 41 of the top detector is illustrated together with the objective 6 comprising the lens 22 and the collimator 24. The lens is able to be slid in relation to the collimator along the optic axis in order to produce a sharp image of the pattern field. Behind the objective 6 reflectors $26_1$ through $26_n$ are provided, which deflect the image rays from the objective onto an image surface 28, where they are scanned or sensed by the sensor means, which supplies corresponding signals to the signal processing means (not illustrated).

Each of the reflectors $26_1$ through $26_n$ is set at 45° to the optic axis of the associated objective and the reflectors are arranged with an offset, equal to a step corresponding to the pattern field of one detector, in a downward direction and toward the objective as shown in FIG. 2. The result of this is an image free of gaps of the pattern fields $4_1$ through $4_n$ on the image surface 28.

Figure 3:
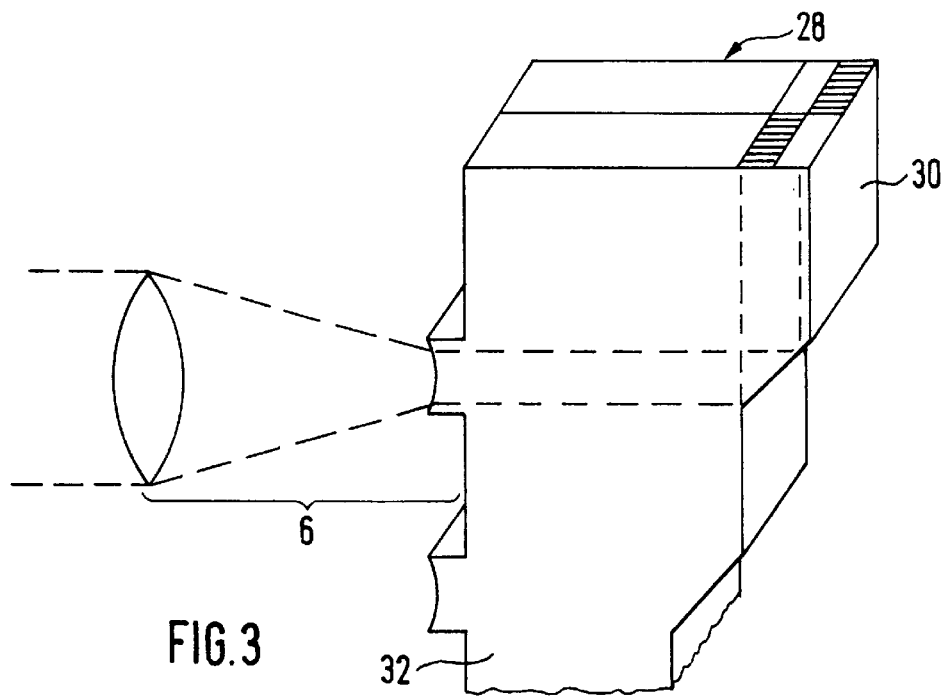
FIG. 3 is a detailed view of the arrangement in FIG. 2.

As shown in FIG. 3 the reflectors are positioned on a side face 30 of an acrylic polymer body 32, whose end face constitutes the image surface 213. The reflectors may be produced by coating or deposition from vapor on the surfaces of the acrylic polymer body 32.

As shown in FIG. 2, the acrylic polymer body 32 has an associated second acrylic polymer body 34, on whose bottom surface a reference image 36 is provided related to the image on the image surface 28. In FIG. 2 the reference image 36 is illustrated separate from the bottom surface of the acrylic polymer body 34 for the sake of simplification, the reference image 36 being provided on the bottom side of the acrylic polymer body 34 in practice.

The reflectors 26 are in this embodiment of the invention in the form of semi-transparent mirrors so that the sensor means, which is opposite to the image surface 28, "sees" both the image of the pattern fields and also the reference surface 36 and the reference surface 36 may be included in processing and may be employed more particularly for checking proper operation of the arrangement.

Figure 4:
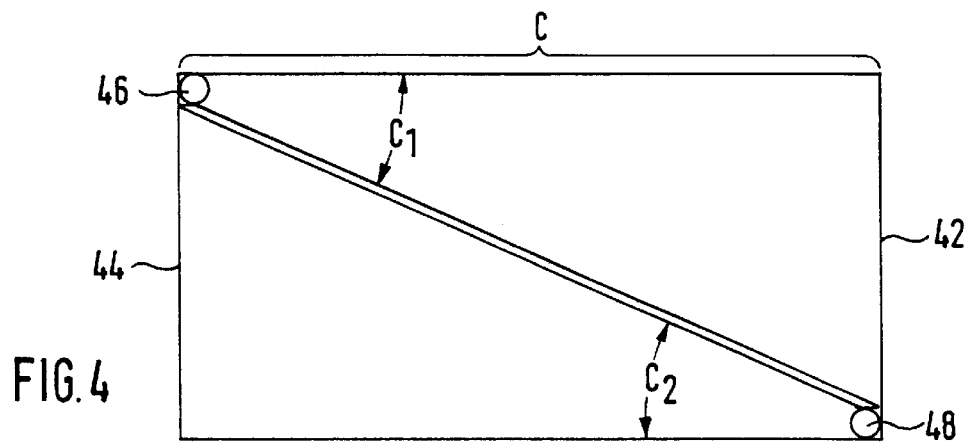
FIG. 4 shows a monitoring means in accordance with a modified form of the invention.

FIG. 4 diagrammatically shows another embodiment of a monitoring means 40 composed of optical detectors of the type described above. In the case of the monitoring means 40 a series of pattern fields 42 and 44 is arranged on the sides of a monitored area C. Two units 46 and 48, which respectively have an objective 50 and a reflector 52 (FIG. 5), are arranged at the diagonally opposite corners of the monitored area C. The units 46 and 48 are arranged rotatably so that the opposite pattern fields 42 and, respectively, 48 may be scanned. The axis of rotation is in this case perpendicular in the plane of FIG. 5.

Figure 5:
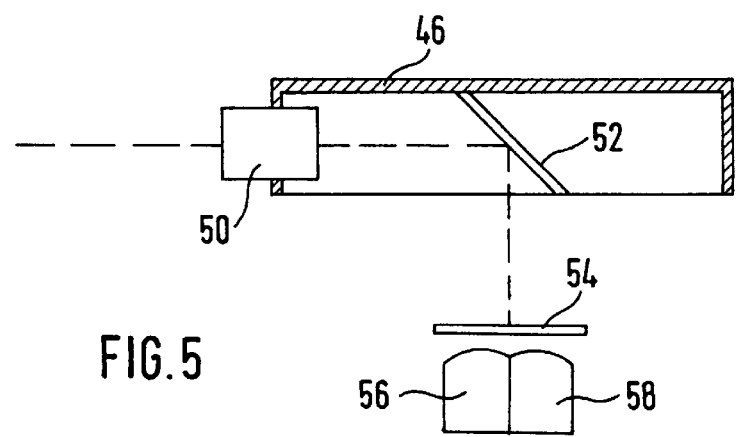
FIG. 5 is a diagrammatic representation of the optical means and of the sensor means in the embodiment of the invention of FIG. 4.

As shown in FIG. 5 the ray path from the objective 50 is via the reflector 52 to a filter 54 which for example is provided for an orange color, to a receiver 56, which accordingly responds to the fields with the corresponding color. A further receiver 58 responds to the other side of the pattern field 4 (FIG. 1) so that the two receivers have outputs in the form of signals with a 90° phase shift, if a pattern field in accordance with FIG. 1 is employed. If a plurality of strip-like pattern fields as in FIG. 1 are put together a striped pattern field as in FIG. 1 will be produced consisting of individual pattern fields.

It is possible for the units 46 and 48 to be only rotatable to the extent that the pattern fields are scanned in sequence firstly in one direction and then in the other direction, which are opposite to that unit. As an alternative the units 46 and 48 may be arranged to be rotatable through full turns. When during such a turn the objective 50 is facing away from the pattern field, it will respond to a reference field, which is provided at a suitable position on the rear side of the unit 46 and, respectively, 48 in order to check the proper function of the arrangement. It will be apparent that in this arrangement the unit 46 monitors the area $C_1$ and the unit 48 the area $C_2$ and that simultaneously the operability of both units is monitored.

It is to be understood that the above description is intended to be illustrative and not restrictive. Many embodiments will be apparent to those skilled in the art upon reviewing the above description. The scope of the invention should, therefore, be determined not as reference to the above description, but should instead be determined with reference to the apended claims along with the full scope of equivalence to which such claims are entitled.

What is claimed is:

1. A monitoring means made up of optical detectors, comprising a plurality of pattern fields, which are arranged at one end of the area to be monitored, objectives at the other end of the area to be monitored and which are respectively associated with the pattern fields, reflectors which deflect the image rays from the objectives onto a image projection surface, a sensor means, onto which the objectives throw an image of the pattern field, and which scans the image and produces scanning signals, and a processing means which is fed by scanning signals of the sensor means and which processing means is configured to ascertain whether the image received by the sensor means possesses the same optical characteristics as the pattern fields.

2. The monitoring means as claimed in claim 1, wherein the sensor means is a CCD camera.

3. The monitoring means as claimed in claim 1, wherein the optical characteristics of the pattern field are such that the pattern field is divided in a predetermined manner into light and dark area parts.

4. The monitoring means as claimed in claim 3, wherein the light area parts possesses an orange color.

5. The monitoring means as claimed in claim 3, wherein the light area parts possesses a fluorescent coloring material.

6. The monitoring means as claimed in claim 3, wherein the light area parts and the dark area parts possesses complementary colors as for example yellow and green.

7. The monitoring means as claimed in claim 3, wherein four area parts are provided, two diagonally opposite area partsbeing light and the two other ones being dark.

8. The monitoring means as claimed in claim 3, wherein the pattern fields are provided in the form of strips.

9. The monitoring means as claimed in claim 1, wherein the objective is provided with a diaphragm, which blanks out an image thrown by the objective on the sensor means with the exception of the image of the area parts.

10. The monitoring means as claimed in claim 1, wherein an objective is arranged for sliding motion along the optic axis.

11. The monitoring means as claimed in claim 1, wherein an objective comprises a convex lens and a collimator.

12. The monitoring means as claimed in claim 11, wherein the convex lens is arranged for sliding motion along the optic axis.

13. The monitoring means as claimed in claim 1, wherein each reflector is at an angle of 45° to the optic axis of the associated objective.

14. The monitoring means as claimed in claim 13, wherein the reflectors are arranged with an offset, equal to a step corresponding to the pattern field of one detector, in a downward direction and toward the objective.

15. A monitoring means made up of optical detectors wherein a series of pattern fields is arranged at opposite sides of an area to be monitored, two units, which respectively comprise an objective and a reflector, are arranged at diagonally opposite corners of the area to be monitored, the units are so rotatably arranged that one objective in each case scans the pattern field arranged opposite to it, and opposite each reflector a sensor means is placed, onto which the objectives throw the image of the pattern field, and which scans the image and and produces scanning signals, and a processing means which is fed by scanning signals of the sensor means and which processing means is configured to ascertain whether the image received by the sensor means possesses the same optical characteristics as the pattern fields.

16. The monitoring means as claimed in claim 15, wherein the sensor means is a CCD camera.

17. The monitoring means as claimed in claim 15, wherein the optical characteristics of the pattern field are such that the pattern field is divided in a predetermined manner into light and dark area parts.

18. The monitoring means as claimed in claim 17, wherein the light area parts possesses an orange color.

19. The monitoring means as claimed in claim 17, wherein the light area parts possesses a fluorescent coloring material.

20. The monitoring means as claimed in claim 17, wherein the light area parts and the dark area parts possesses complementary colors as for example yellow and green.

21. The monitoring means as claimed in claim 17, wherein four area parts are provided, two diagonally opposite area partsbeing light and the two other ones being dark.

22. The monitoring means as claimed in claim 17, wherein the pattern fields are provided in the form of strips.

23. The monitoring means as claimed in claim 15, wherein the objective is provided with a diaphragm, which blanks out an image thrown by the objective on the sensor means with the exception of the image of the area parts.

24. The monitoring means as claimed in claim 15, wherein an objective is arranged for sliding motion along the optic axis.

25. The monitoring means as claimed in claim 15, wherein an objective comprises a convex lens and a collimator.

26. The monitoring means as claimed in claim 25, wherein the convex lens is arranged for sliding motion along the optic axis.

27. The monitoring means as claimed in claim 15, wherein each reflector is at an angle of 45° to the optic axis of the associated objective.

28. The monitoring means as claimed in claim 15, wherein the reflectors are arranged with an offset, equal to a step corresponding to the pattern field of one detector, in a downward direction and toward the objective.

29. The monitoring means as claimed in claim 15, wherein the reflector is a semi-transparent mirror and in that on a basic area, which as regards, the semi-transparent mirror arrangement is opposite to the image projection area, a reference image related to the image is provided on the image projection area is produced.

30. The monitoring means as claimed in claim 15, wherein the reflectors are produced by machining one side face of an acrylic polymer body, whose top face, which is perpendicular to the side face, constitutes the image projection area.

31. The monitoring means as claimed in claims 15, wherein the units are only able to be turned to such an extent that the pattern fields only are scanned.

32. The monitoring means as claimed in claim 15, wherein the units are able to be turned through complete revolutions, and in this case, when the objective is turned away from a pattern field, a reference image is detected for checking correct operation of the arrangement.

* * * * *